United States Patent
Perkins et al.

(10) Patent No.: US 7,018,737 B2
(45) Date of Patent: Mar. 28, 2006

(54) BATTERY PACK INCLUDING RECHARGEABLE BATTERIES

(75) Inventors: Michael Perkins, Santa Clara, CA (US); Stuart Kurdi, Mountain View, CA (US); George W. Heropoulos, Morgan Hill, CA (US); Larry Lynch, Los Gatos, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 0 days.

(21) Appl. No.: 10/692,074

(22) Filed: Oct. 22, 2003

(65) Prior Publication Data

US 2004/0157116 A1    Aug. 12, 2004

Related U.S. Application Data

(60) Provisional application No. 60/446,829, filed on Feb. 10, 2003, provisional application No. 60/506,254, filed on Sep. 26, 2003.

(51) Int. Cl.
*H01M 2/00* (2006.01)

(52) U.S. Cl. ........................ 429/163; 429/164; 429/167

(58) Field of Classification Search ................ 429/163, 429/164, 167
See application file for complete search history.

(56) References Cited

U.S. PATENT DOCUMENTS

| | | | | |
|---|---|---|---|---|
| 3,662,166 | A | * | 5/1972 | Dietz ........................ 362/201 |
| 4,692,680 | A | | 9/1987 | Sherer |
| 4,818,928 | A | | 4/1989 | Schosser |
| 5,681,070 | A | | 10/1997 | Williams et al. |
| 6,238,818 | B1 | * | 5/2001 | Dalton ........................ 429/96 |
| 6,385,468 | B1 | | 5/2002 | Arnold |
| 6,505,949 | B1 | * | 1/2003 | Naghi et al. ................ 362/109 |
| 2003/0048599 | A1 | * | 3/2003 | Martin ........................ 361/683 |

\* cited by examiner

*Primary Examiner*—Dah-Wei Yuan
(74) *Attorney, Agent, or Firm*—Townsend and Townsend and Crew LLP (57) ABSTRACT

A battery pack is disclosed. The battery pack includes a housing, and a rechargeable power source within a linear portion the housing. The linear portion of the housing is receivable in first and second battery holding regions of another housing. The first and second battery holding regions are aligned along the same axis.

4 Claims, 13 Drawing Sheets

BATTERY PACK INCLUDING RECHARGEABLE BATTERIES

CROSS-REFERENCE TO RELATED APPLICATIONS

This patent application claims the benefit of U.S. Provisional Patent Application No. 60/446,829, entitled "Interactive Hand Held Apparatus With Stylus" filed on Feb. 10, 2003, and U.S. Provisional Patent Application No. 60/506,254, entitled "Battery Pack," filed on Sep. 26, 2003.

BACKGROUND OF THE INVENTION

Electronic apparatuses that can accept both non-rechargeable batteries and rechargeable battery packs are desirable. Rechargeable battery packs are desirable, since non-rechargeable batteries are expensive. Non-rechargeable batteries are desirable when a rechargeable battery pack is not readily available. For example, a child playing a hand-held gaming apparatus in a car may find that the power in a rechargeable battery pack has been depleted. It is not convenient to recharge the battery pack, since the corresponding battery charger is at the child's home. Non-rechargeable batteries, on the other hand, are easily carried and can be purchased at any convenient location.

There are commercially available rechargeable battery packs on the market. For example, a rechargeable battery pack is used with an Olympus Camedia™ digital camera. The battery pack is configured to fit in a well in the digital camera. The well alternatively holds four AA size batteries, where the four batteries are side-by-side so that the batteries are in a two-by-two array in the well. There are essentially two layers of batteries. The rechargeable battery pack also has a configuration similar to the four side-by-side batteries.

While the above rechargeable battery pack is suitable for some uses, the rechargeable battery pack is quite bulky precludes the digital camera from having a thin profile. Consumers of electrical apparatuses continue to prefer using apparatuses that are both portable and thin.

In the digital camera described above, it may be possible to reduce the number of batteries so that the digital camera can be thinner. However, this change would reduce the amount of operating time for the digital camera.

Embodiments of the invention address these and other problems.

SUMMARY OF THE INVENTION

Some embodiments of the invention are directed to electrical apparatuses and battery packs.

One embodiment of the invention is directed to an electrical apparatus comprising: (a) an electrical device comprising (i) a housing including a first battery holding region capable of holding a first battery and a second battery holding region capable of holding a second battery, wherein the first and second battery holding regions are aligned along a same axis, and (ii) a battery separator between the first battery holding region and the second battery holding region; and (b) a battery pack including (i) a body, and (ii) a rechargeable power source within the body, wherein at least a portion of the body is receivable in the first and second battery holding regions.

Another embodiment of the invention is directed to a battery pack comprising: (a) a body; and (b) a first rechargeable battery; (c) a second rechargeable battery; and (d) an aperture in the linear portion of the housing in between the first rechargeable battery and the second rechargeable battery, wherein the aperture is capable of receiving a battery separator.

Another embodiment of the invention is directed to an electrical apparatus comprising: (a) an electrical device comprising (i) a housing including a first battery holding region capable of holding a first battery and a second battery holding region capable of holding a second battery, wherein the first and second battery holding regions are aligned along a first axis, a third battery holding region capable of holding a third battery and a fourth battery holding region capable of holding a fourth battery, wherein the third and fourth battery holding regions are aligned along a second axis, and (ii) a first battery separator between the first battery holding region and the second battery holding region, and a second battery separator between the third battery holding region and the fourth battery holding region; and (b) a battery pack including (i) a body, and (ii) a rechargeable power source within the body, wherein a first linear portion of the battery pack is receivable in the first and second battery holding regions and wherein a second linear portion of the battery pack is receivable in the third and fourth battery holding regions, and wherein an intermediate portion couples the first linear portion and the second linear portion.

In some embodiments, the battery pack can include a magnet (or other indicator element) that interacts with another element in a battery pack recharger to indicate that the battery pack (and not an inadvertent bridging conductor such as a coin) is on the battery pack recharger. As explained below, this can reduce the risk of a potential fire hazard.

These and other embodiments of the invention are discussed in further detail below.

BRIEF DESCRIPTION OF THE DRAWINGS

FIG. 1 shows a bottom perspective view of an electrical apparatus according to an embodiment of the invention, with a bottom cover on.

FIG. 4(*a*) shows a bottom perspective view of an electrical device according to an embodiment of the invention.

FIG. 4(*b*) shows a partial perspective and partial cross-sectional view of an electrical apparatus according to an embodiment of the invention.

FIGS. 11(*a*) and 11(*b*) are schematic side views of another embodiment of the invention.

DETAILED DESCRIPTION

Embodiments of the invention are directed to an electrical apparatus comprising an electrical device comprising a housing including a first battery holding region capable of holding a first non-rechargeable battery and a second battery holding region capable of holding a second non-rechargeable battery, wherein the first and second battery holding regions are aligned along the same axis. A battery separator is disposed between the first battery holding region and the second battery holding region. At least a portion of a battery pack including a body and a rechargeable power source is receivable in the first and second battery holding regions. The rechargeable power source may comprise one or more rechargeable batteries.

A battery separator is required in certain products (e.g., toys) to protect a user from installing the batteries backwards and thereby risking battery failure and leakage of corrosive materials from those batteries. A typical battery separator can be movable or non-movable, and can include conductive or non-conductive materials. It may be a thin structure that is configured to allow to adjacent in-line batteries to contact each other or not contact each other. Examples of battery separators are provided below.

Figure 1:
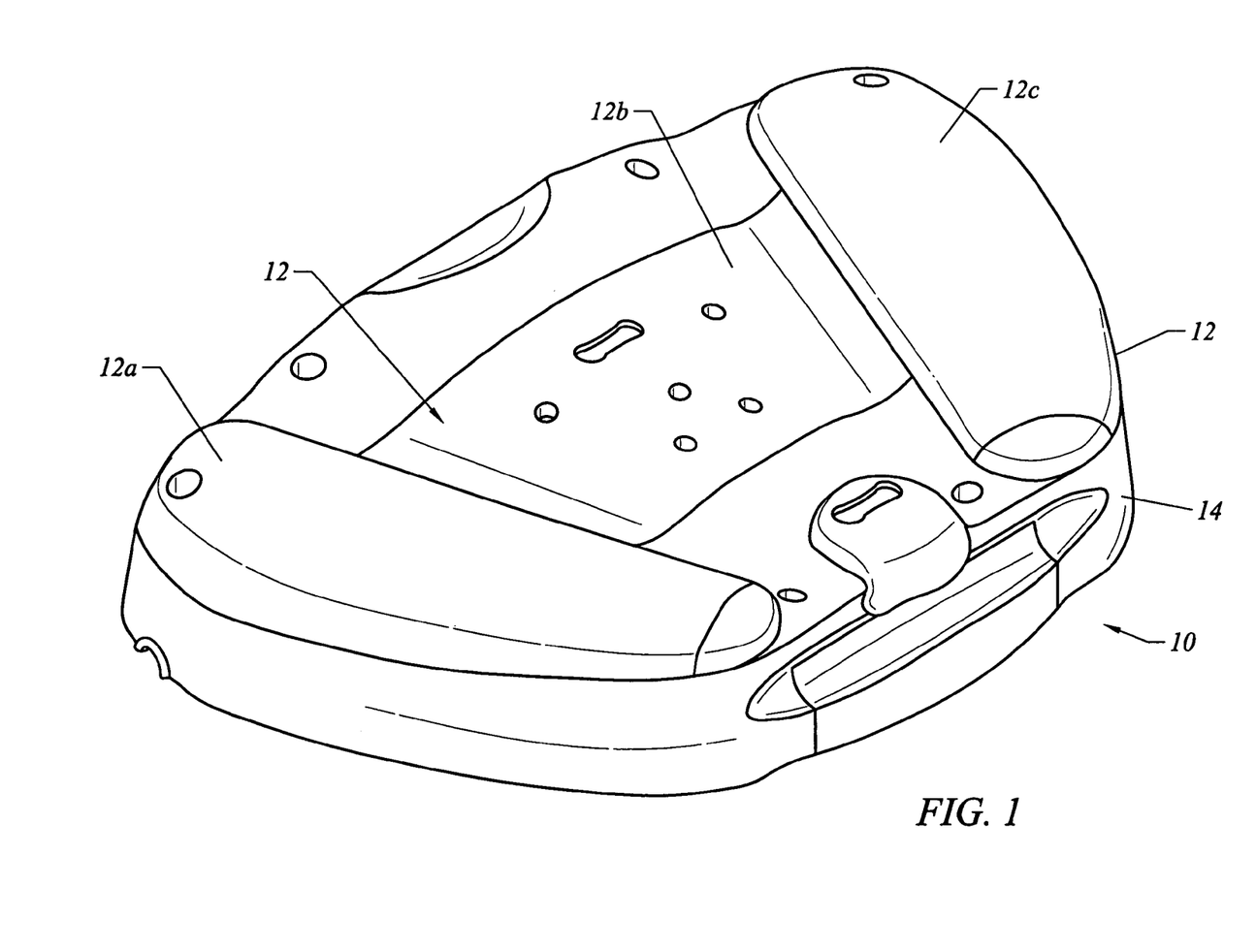

FIG. 1 shows a bottom perspective view of an electrical apparatus 10 according to an embodiment of the invention. The electrical apparatus 10 includes an electrical device 14 and a back cover 12 attached to the electrical device 14.

The back cover 12 is cooperatively structured with a back surface of the electrical device 14. The back cover 12 has a first linear portion 12(a), a second linear portion 12(c), and an intermediate portion in between the first linear portion 12(a) and the second linear portion 12(c). The first and second linear portions 12(a), 12(c) have ends that converge towards each other and opposite ends that diverge away from each other.

The electrical device 14 illustrated in FIG. 1 is part of a hand held gaming device of the type described in U.S. Provisional Patent Application No. 60/446,829, filed on Feb. 10, 2003, which is herein incorporated by reference in its entirety. Other suitable electrical devices include parts of digital cameras, personal digital assistants (PDAs), book reading devices (e.g., as described in U.S. patent application Ser. No. 09/777,262, which is herein incorporated by reference in its entirety), portable video players, etc. The electrical device may include a processor, a memory coupled to the processor, an output device such as a speaker or display screen coupled to the processor, and one or more input devices coupled to the processor. As used herein, an electrical apparatus can include an electrical device and standard non-rechargeable batteries used to power the electrical device, or a battery pack including a rechargeable power source.

Figure 2:
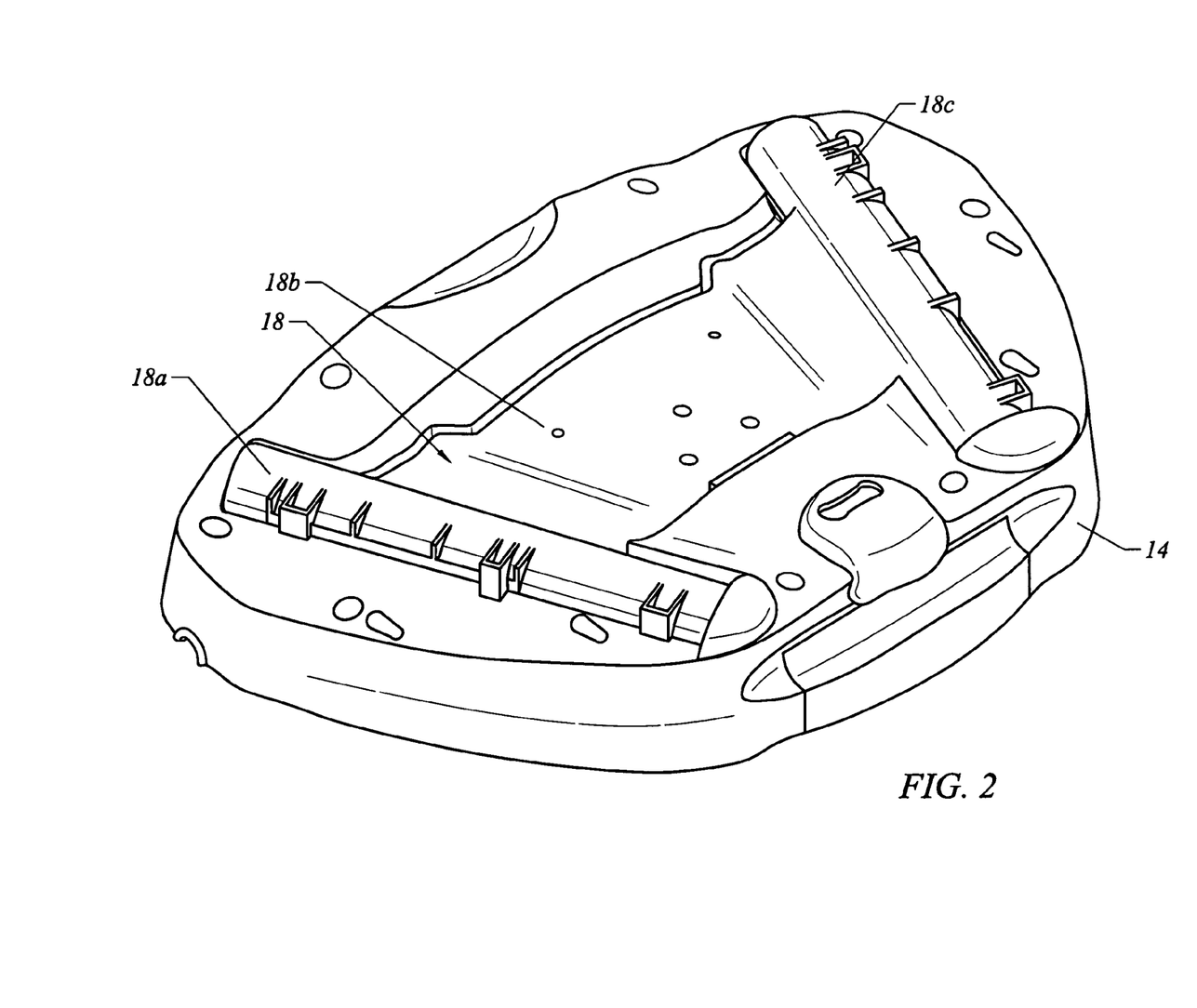
FIG. 2 shows a bottom perspective view of an electrical apparatus according to an embodiment of the invention, with a bottom cover off.

FIG. 2 shows a battery pack 18 according to an embodiment of the invention. The battery pack 18 also includes a first linear portion 18(a) and a second linear portion 18(c). An intermediate portion 18(b) is between the first and second linear portions 18(a), 18(c). The first and second linear portions 18(a), 18(c) have ends that converge toward each other and ends that diverge away from each other. Each of the first and second linear portions 18(a), 18(c) has a shape that is substantially similar to two ordinary household batteries (e.g., AA size batteries) aligned end to end.

The battery pack 18 may include any suitable rechargeable power source. For example, the battery pack 18 may comprise two nickel-cadmium or two nickel-metal-hydride batteries in the first linear portion 18(a) aligned end-to-end, and two nickel-cadmium or two nickel-metal-hydride batteries in the second linear portion 18(c) aligned end to end. Other types of rechargeable batteries are known to those of ordinary skill in the art and may be used in place of or in addition to nickel-cadmium or nickel-metal-hydride batteries.

The two outward first and second linear portions 12(a), 12(c) of the back cover 12 and the two outward first and second linear portions 18(a), 18(c) of the battery pack 18 are specifically shaped to perform specific functions. For example, when the electrical apparatus 10 is a hand-held gaming device, the first and second linear outer portions 12(a), 12(c) of the back cover 12 and the first and second linear portions 18(a), 18(c) of the battery pack 18 can function as ergonomic hand grips and as a battery storage area. When the hand-held gaming device is held by the user, the fingers of the user's right hand can wrap around the first linear outer portion 12(a) of the back cover 12 and the fingers of the user's left hand can wrap around the second linear outer portion 12(c) of the back cover 12. The user's grip is more comfortable than if, for example, the electrical apparatus had a completely flat back.

Figure 3:
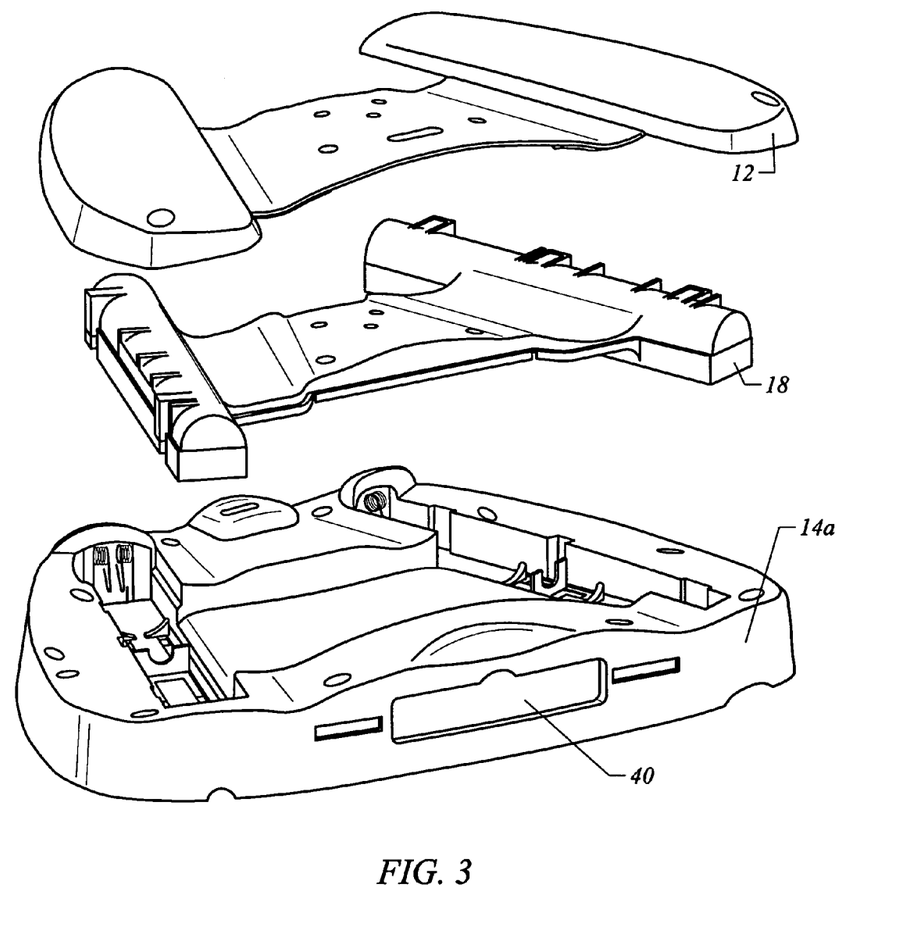
FIG. 3 shows an exploded view of an electrical apparatus according to an embodiment of the invention.

FIG. 3 shows an exploded view of the battery pack 18, the back cover 12, and a housing 14(a) of the electrical device. The housing 14(a) also includes a region 40 where a memory cartridge (not shown) would be inserted into the electrical device to provide the electrical device with specific content. As shown in FIG. 3, the electrical device 14 has a housing that includes a H-shaped recess that is cooperatively structured with respect to the shape of a body of the battery pack 18. Although the body 18 is shown as substantially covering an internal power source, the body 18 need not substantially cover the internal power source in other embodiments. For example, the body 18 could be an open holder that holds two batteries together in an in-line orientation in other embodiments of the invention.

Figure 4A:
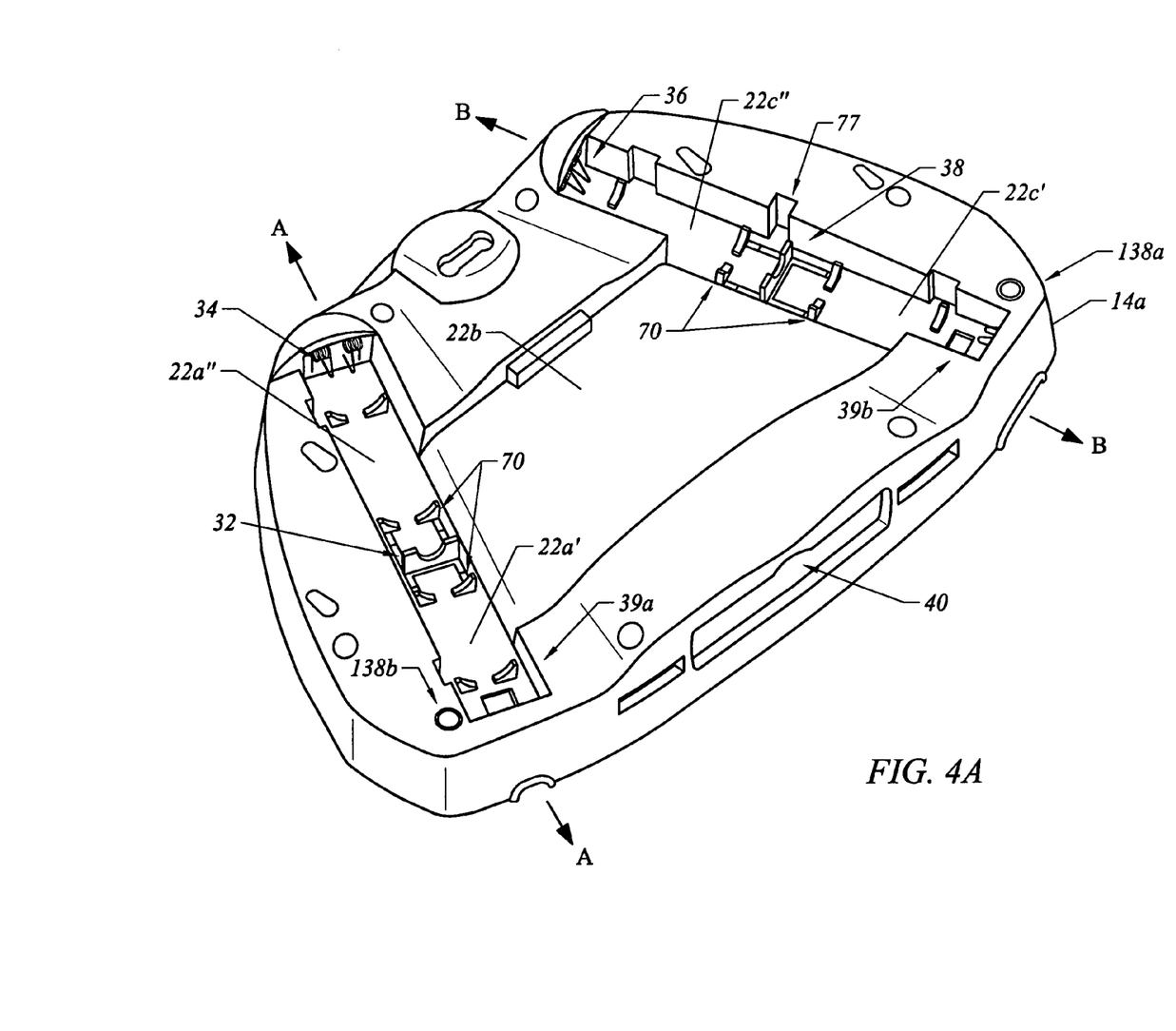

FIG. 4(a) shows a perspective view of the bottom surface of the housing 14(a) of the electrical device. As shown in FIG. 4, the left side of the electrical device includes a first battery holding region 22(a)' and a second battery holding region 22(a)". The first and second battery holding regions 22(a)', 22(a)" are aligned end-to-end along a first axis A. A first battery separator 32 projects perpendicular to the orientation of the back surface of the housing 14(a), and separates the first and second battery holding regions 22(a)', 22(a)".

As shown in FIG. 4(a), the right side of the electrical device includes a third battery holding region 22(c)' and a fourth battery holding region 22(c)". The third and fourth battery holding regions 22(c)', 22(c)" are also aligned end-to-end along a second axis B. A second battery separator 38 separates the third battery holding region 22(c)' and the fourth battery holding region 22(c)". The second battery separator 38 projects up from the housing 14(a). A side electrical contact 77 may be present and may contact a corresponding contact on the battery pack (not shown) that can lie in the first, second, third, and fourth battery holding regions 22(a), 22(a)', 22(c), 22(c)".

Each of the first, second, third, and fourth battery holding regions 22(a)', 22(a)", 22(c)', 22(c)" may include a number of battery support structures 70 that help position batteries that are placed within the battery holding regions 22(a)', 22(a)", 22(c)', 22(c)". In FIG. 4(a), each of the battery support structures 70 includes an outer surface that resembles an arc. The arc surface of each support structure 70 conforms to the shape of the battery that the battery support structure 70 would support.

Each of the first, second, third, and fourth battery holding regions 22(a)', 22(a)", 22(c)', 22(c)" is respectively capable of holding a first, second, third, or fourth, non-rechargeable battery. The non-rechargeable batteries may be standard batteries such as AAA, AA, C, and D size standard batteries. Each such battery may have a generally cylindrical shape with a protruding head portion that forms a positive battery terminal and a flat tail end that forms a negative battery terminal. Since the various holding regions are capable of holding standard non-rechargeable batteries, they are also capable of holding standard size rechargeable batteries as well. For example, many nickel-cadmium standard size rechargeable AAA, AA, C, and D size rechargeable batteries are commercially available and can be received in the various battery holding regions.

An intermediate recess region 22(b) is between the first and second battery holding regions 22(a)', 22(a)" and the third and fourth battery holding regions 22(c)', 22(c)". Aligning pins (or other aligning structures) (not shown) can be provided at the intermediate recess region 22(b) and can interface with aligning holes at the intermediate region of the battery pack.

Holes 138(a), 138(b) are provided in the housing 14(a). These holes can receive screws so that the back cover 12 (see FIG. 1) can be secured to the housing 14(a). Electrical contacts 39(a), 39(b) are at outer ends of the first and third battery holding regions 22(a)', 22(c)' and will contact electrical contacts in the battery pack (not shown in FIG. 4) so that power can be supplied from the battery pack to the electrical device.

Each of the first and second battery separators 32, 38 include a U-shaped vertical portion extending from the H-shaped base. A U-shaped vertical portion is provided so that two non-rechargeable batteries in the first and second battery holding regions 22(a)', 22(a)" can make end-to-end electrical contact with each other. The U-shaped upper portions of the first and second battery separators 32, 38 ensure that any batteries in the first, second, third, and fourth battery holding regions 22(a)', 22(a)", 22(c)', 22(c)" are placed in the correct orientation. For example, the positive end of a typical AA battery (not shown) has a small projecting head portion that is in the second battery holding region 22(a)" would extend through the U-shaped portion of a battery separator. The projecting head potion would make physical and electrical contact with the flat tail portion of an AA battery in the first battery holding region 22(a)'. If the tail portion of an AA battery in the second battery holding region 22(a)" is next to the battery separator 32 and the head portion of the battery is next to the torsion spring 34, the electrical device would not work since the battery would not be oriented properly. Accordingly, the battery separator 32 prevents the user from putting batteries into the first and second battery holding regions 22(a)', 22(a)" in the incorrect order.

Two torsion springs 34, 36 (other biasing elements such as compression springs could be used) are provided at the outer ends of the second battery holding region 22(a)" and the fourth battery holding region 22(c)", respectively. The torsion springs 34, 36 contact the flat negative terminals of the batteries that are in the second and fourth battery holding regions 22(a)", 22(c)". Additional electrical contacts (not shown) can be provided at the outer end walls defining the first and third battery holding regions 22(a)', 22(a)" so that the positive terminals of batteries can contact them and complete a circuit. In this embodiment, the electrical device has one set of electrical contacts for a battery pack including a rechargeable power source and another set of electrical contacts for standard non-rechargeable batteries.

In the embodiment shown in FIG. 4(a), each of the first and second battery separators 32, 38 can have some lateral movement. This permits different sizes of the same type of battery to be received in the first and second battery holding regions. For example, an Energizer™ AA battery and a Duracell™ AA battery may have the same general configuration, but may have slightly different lengths, even though they are both AA size batteries. As shown in FIG. 4(a), an H-shaped groove is provided where the base of each battery separator 32, 38 is located.

Figure 4B:
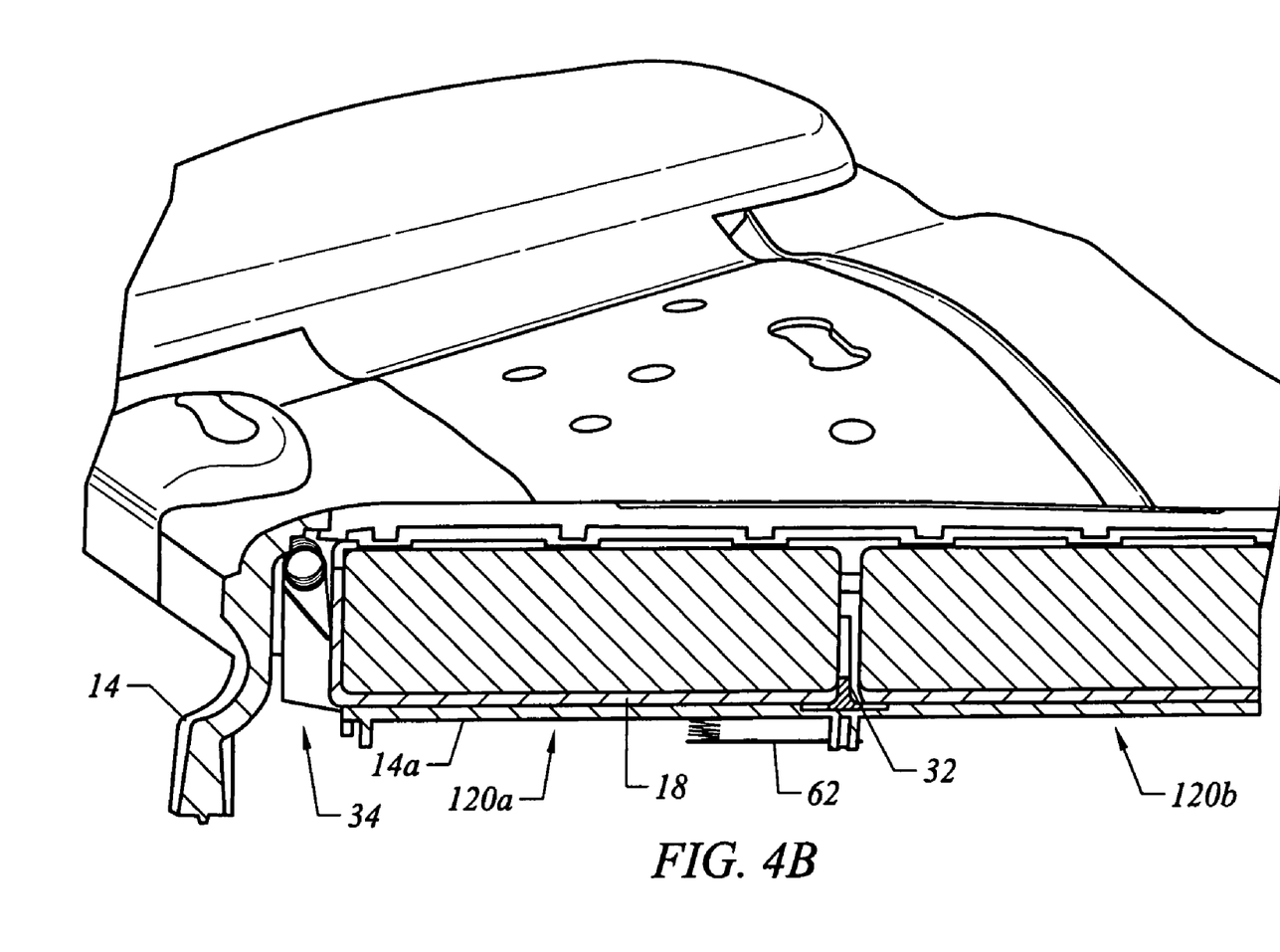

FIG. 4(b) shows a partial perspective and a partial side cross-sectional view of an electrical apparatus when it uses a battery pack according to an embodiment of the invention. FIG. 4(b) shows a torsion spring 34 that is behind a negative terminal of a first rechargeable battery 120(a). A battery separator 32 passes through an aperture in the body of the battery pack 18 and is between the first rechargeable battery 120(a) and a second rechargeable battery 120(b). A fixed spring element 62 is attached to the housing 14(a) of the electrical device 14. The fixed spring element 62 includes a coil that is fixed, and arms that are coupled to the battery separator 32. The battery separator 32 passes through a hole in the housing 14(a) of the electrical device 14. This provides the battery separator 32 with the ability to move from side to side so that slightly different size batteries of the same type can be received in the battery holding regions.

Figure 5:
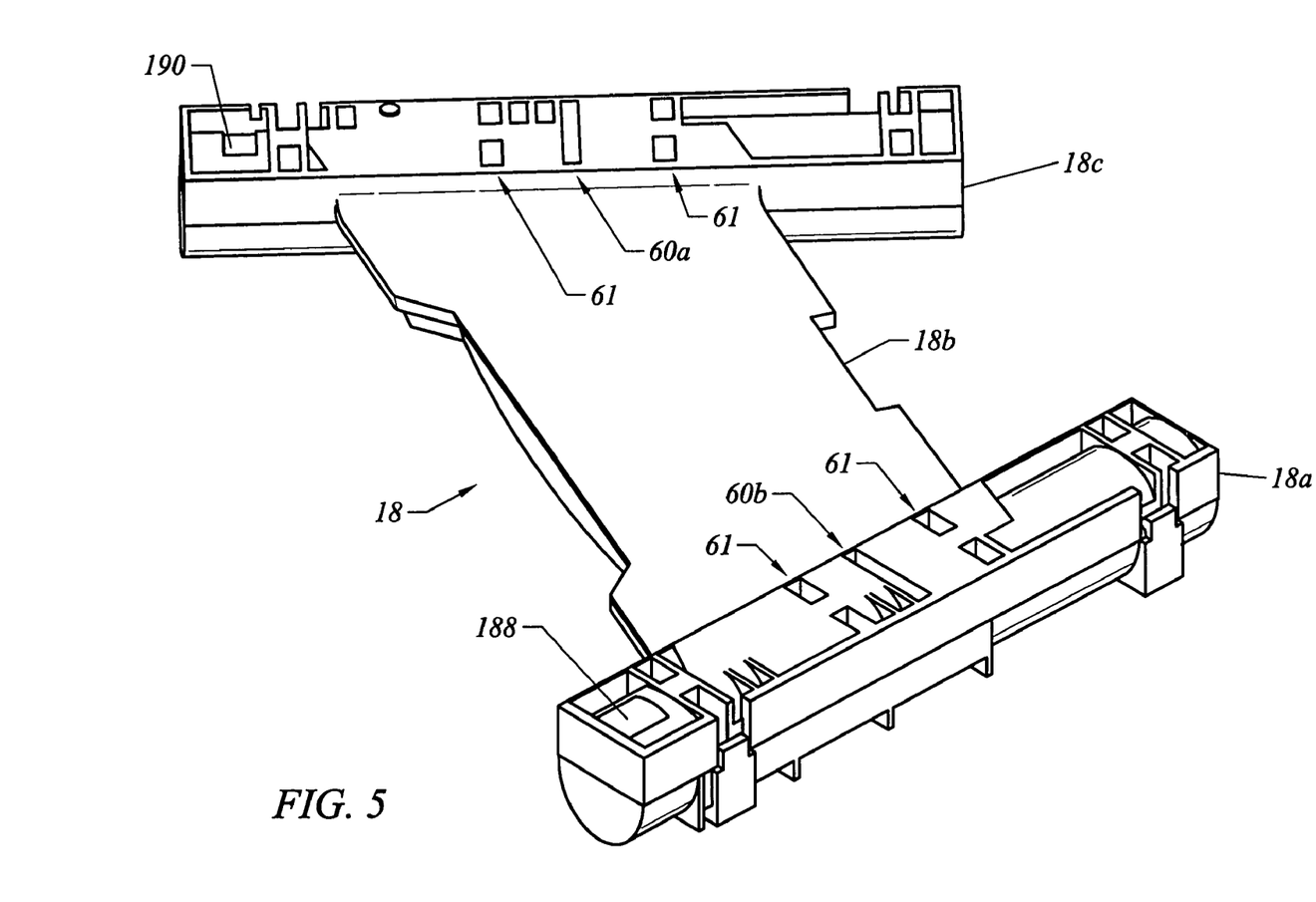
FIG. 5 shows a perspective view of a battery pack.

FIG. 5 shows a perspective view of a battery pack 18 according to an embodiment of the invention. The battery pack 18 has a first linear portion 18(a), a second linear portion 18(c), and an intermediate portion 18(b) coupling the first linear portion 18(a) and the second linear portion 18(c). The intermediate portion 18(b) has a generally flat shape. Each of the first and second linear portions 18(a), 18(c), and the generally flat intermediate portion 18(b) can have a common material such as molded plastic. Unlike the conventional rechargeable battery pack described above, the illustrated battery pack is thin and has four rechargeable batteries in a single layer and not in multiple layers. In other embodiments, there may be more or less than four rechargeable batteries in the battery pack.

The first and second linear portions 18(a), 18(c) of the battery pack 18 respectively include first and second apertures 60(a), 60(c). In this embodiment, the first and second apertures 60(a), 60(c) are in the form of transverse slots. When the battery pack 18 is received in the recess 22 in the housing 14(a), the battery separators 32, 38 are received in the first and second apertures 60(a), 60(c), respectively. Thus, the first and second apertures 60(a), 60(c) can be cooperatively structured to receive the battery separators 32, 38. Additional apertures 61 are provided to receive the battery support structures 70 (see FIG. 4). Electrical contacts 188, 190 form input and output terminals for the battery pack and can interface with the electrical contacts 39(a), 39(b) at the ends of the first and third battery holding regions 22(a)', 22(c)'.

Figure 6:
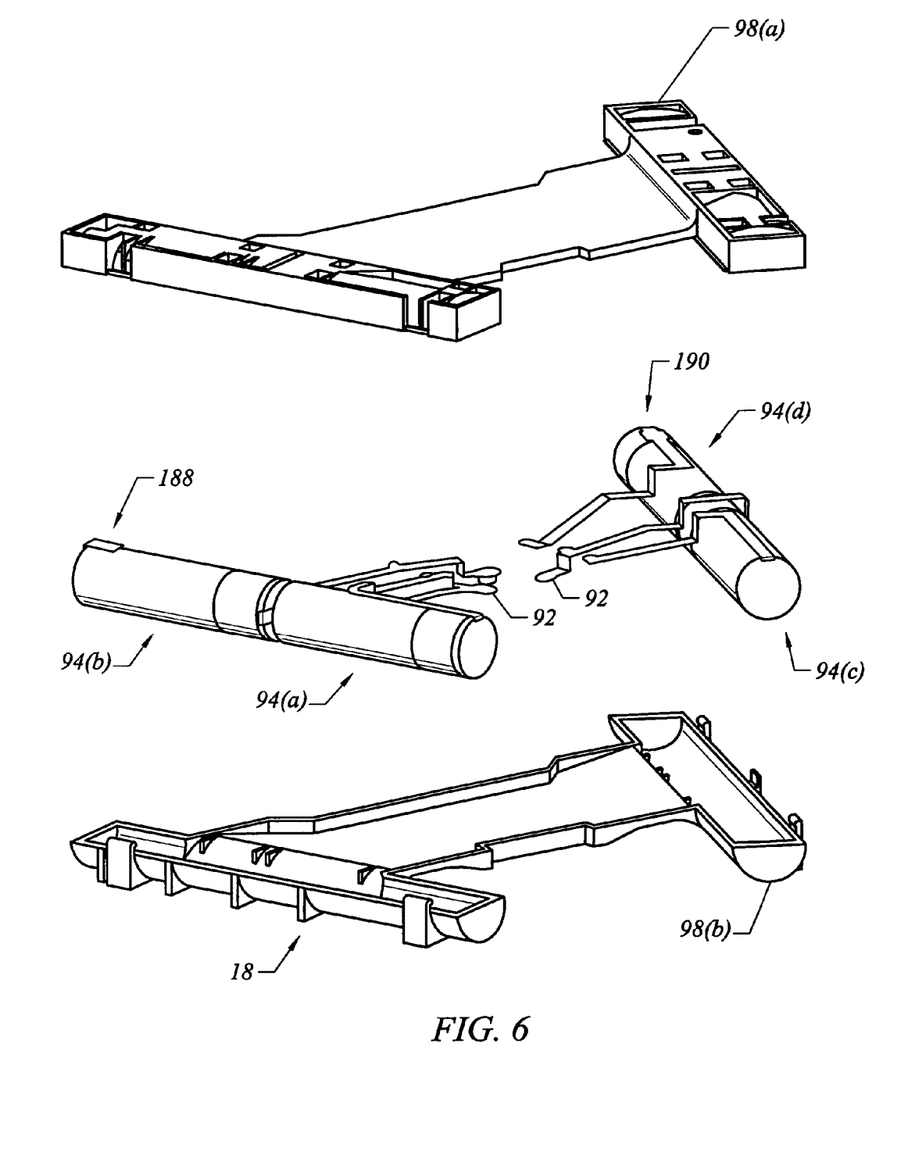
FIG. 6 shows an exploded view of a battery pack.

FIG. 6 shows an exploded view of the battery pack 18. The exploded view shows a rechargeable power source in the form of four rechargeable batteries 94(a), 94(b), 94(c), 94(d) enclosed between first and second body portions 98(a), 98(b). A number of electrical conductors 92 (e.g., wires, printed circuits) can be internal to the first and second body portions 98(a), 98(b), and can be used to provide power to the rechargeable batteries when they need to be recharged. The terminal ends of the conductors 92 may form electrical contacts that are exposed through or accessible through the housing portion 98(b). Electrical contacts 188, 190 are accessible through apertures in the body portion 98(a).

Figure 7:
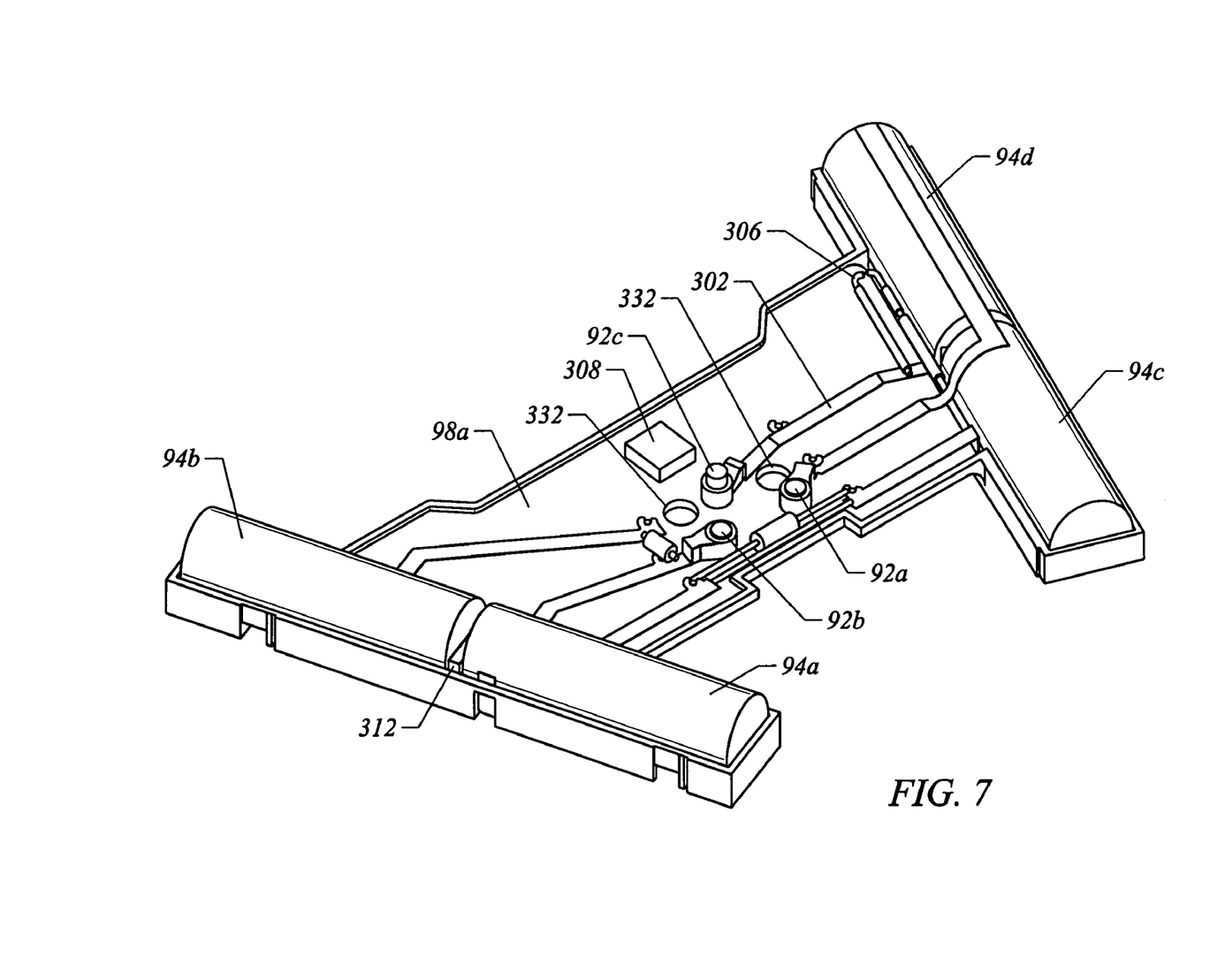
FIG. 7 shows a perspective view of the battery pack with a bottom body portion of the battery pack removed.

FIG. 7 shows a perspective view of four rechargeable batteries 94(a), 94(b), 94(c), 94(d) in battery holding regions in the battery pack. Bridging conductive strips 312 can be between each pair of rechargeable batteries 94(a)–94(b), 94(c)–94(d) to provide an electrically conductive path between the batteries in each pair. These and other conductive strips can be glued or welded onto the batteries 94(a), 94(b), 94(c), 94(d) and the body portion 98(a) as shown to complete a circuit.

FIG. 7 shows three electrical terminals 92(a), 92(b), 92(c) that will be accessible through the body portion (not shown) of the battery pack. Two of the electrical terminals 92(a), 92(b) can respectively serve as input and output terminals (or vice versa) for the four rechargeable batteries 94(a), 94(b), 94(c), 94(d) in the battery pack. One terminal 92(a) can be a positive terminal and one terminal 92(b) can be a negative terminal (or vice versa). The third electrical terminal 92(c) is electrically coupled to a thermistor 306, which can be used to monitor the temperature.

Other safety features can also be present in the battery pack. For example, a small magnet 308 can be provided in the battery pack. When the battery pack is placed on a battery recharger (not shown in FIG. 7), the small magnet 308 can interact with a magnetically activated switch (such as a Reed Switch, Hall effect transistor switch, or other switch) in the housing of the battery recharger to indicate to the battery recharger that the battery pack is in fact on the battery recharger. Once the battery pack is identified to the battery recharger, the battery recharger can recharge the battery pack. If the small magnet 308 is not present, then the positive and negative electrical terminals on the battery recharger could accidentally activate if an electrically conductive body such as coin, a wire, etc. bridges the two conductive charging terminals in the battery recharger. Using the magnet 308 (or other battery pack indicator element) can reduce the potential risk a creating a fire.

Two alignment holes 332 are in the body portion 98(a). They can be used to help a user align the battery pack with the electrical device. Corresponding alignment pins 804 (or other alignment elements) are shown in FIG. 8, where FIG. 8 shows another embodiment of the invention.

Figure 8:
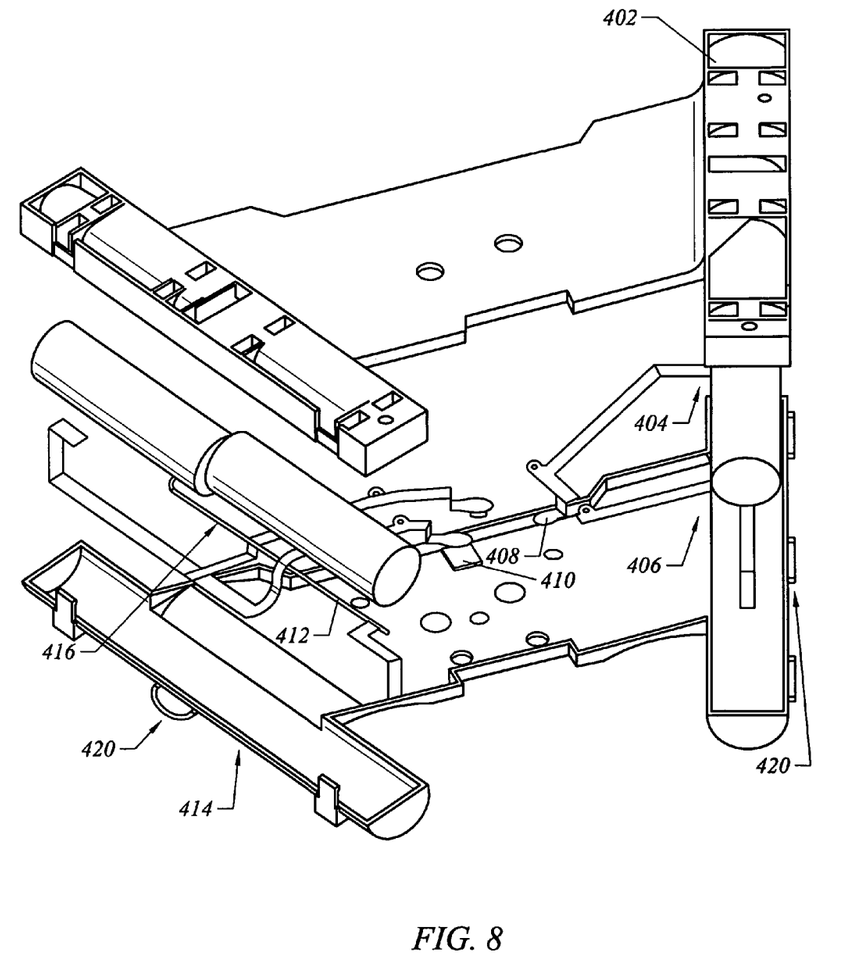
FIG. 8 shows an exploded perspective view of another battery pack according to another embodiment of the invention.

FIG. 8 shows another battery pack embodiment. This embodiment includes a first body portion 402 and a second body portion 414. Unlike the prior embodiment, this embodiment includes finger beams 420 (or other outwardly extending structures) extending from the second body portion 414. These finger beams 420 allow one to lift the battery pack out of a recess in an electrical device that holds the battery pack.

The battery pack also includes rechargeable batteries 404, a connect plate between the rechargeable batteries 404 and the second body portion 414, a magnet 410 on the second body portion 414, a thermistor 416 (as described previously) and a wire 408 coupled to the rechargeable batteries 404.

A resettable device 412 such as a commercially available polyswitch™ is present in the battery pack. Resettable devices are not fuses, but are nonlinear-thermistors that limit current. These devices limit the flow of high currents during fault conditions. Unlike a traditional fuse that works one time and is replaced, a resettable device resets after a particular fault is cleared. In the battery pack, the resettable device 412 can shut down the charging of the battery pack. The resettable device 412 can lie against the rechargeable batteries and can sense heat. It can also be inline with internal electrical contacts in the battery pack. If there is a change in temperature above a predetermined threshold, then the resettable device can shut down a battery charging operation until the batteries cool down (or return to a normal voltage level).

Figure 9:
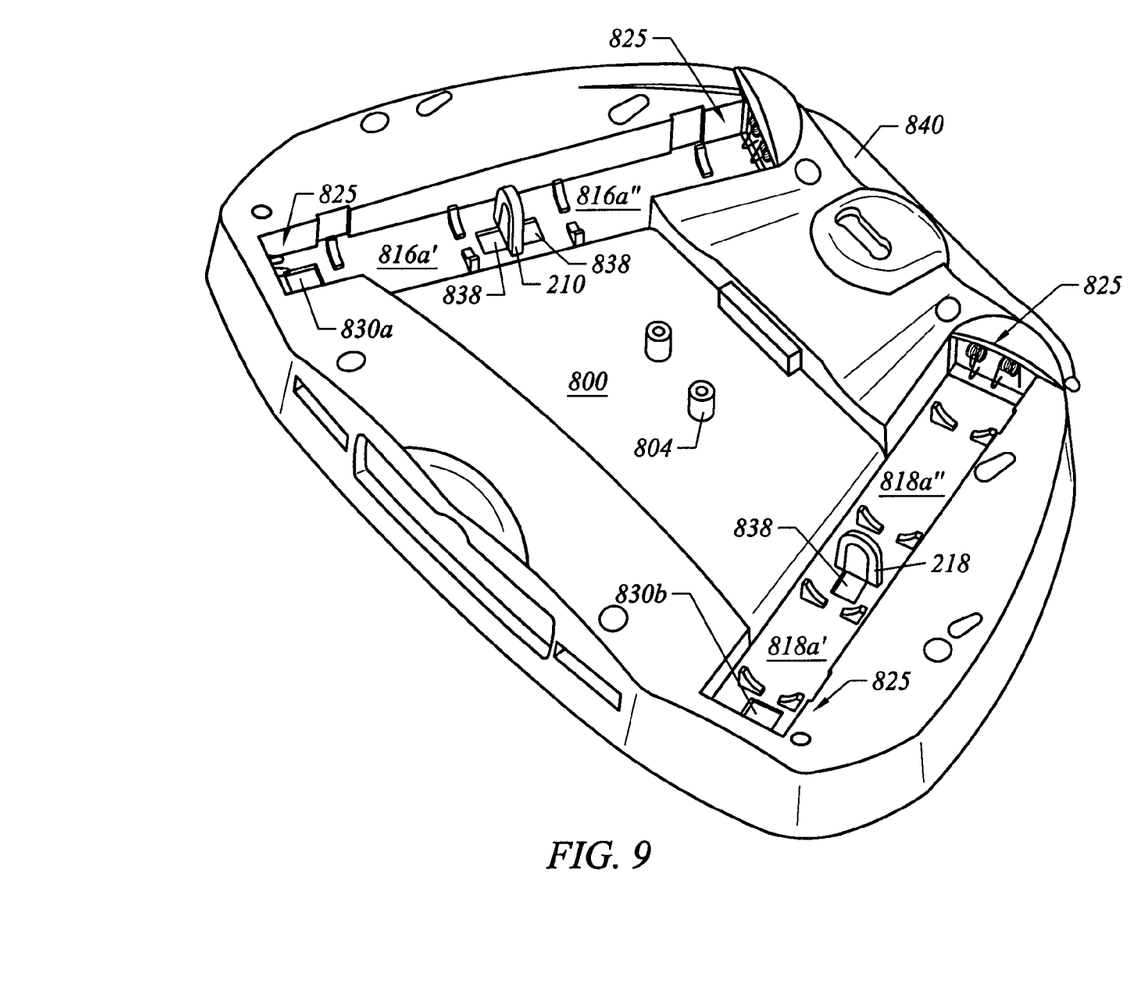
FIG. 9 shows a bottom perspective view of another electrical device according to an embodiment of the invention.

FIG. 9 shows a housing 800 of an electrical device, where two posts 804 extend upward from the housing 800. The posts 804 can be used to align the battery pack (not shown) in the H-shaped recess shown in FIG. 9. Like the prior embodiments, battery separators 210, 218 are between adjacent, in-line battery holding regions 816(a)', 816(a)" and 818(a)', 818(a)". Torsion springs 825 are at both ends of adjacent, in-line battery holding regions 816(a)', 816(a)" and 818(a)', 818(a)" in this embodiment. The battery separators 210, 218 in this embodiment may be rigid (e.g., no or substantially no side-to-side movement) and may include electrical contacts 838 at both sides of the battery separators 210, 218. These electrical contacts 838 may receive or be in contact with the positive terminals of standard non-rechargeable batteries. In other words, when four batteries are in the four battery holding regions 816(a)', 816(a)", 818(a)', 818(a)", the positive terminals of each battery can face the battery separators 210, 218, while the flat negative terminal of each battery contacts one of the torsion springs 825. The configuration of the torsion spring discourages a user from placing a protruding head of a positive terminal of a battery against it, so that the arrangement shown in FIG. 9 encourages a user to put batteries in the battery holding regions 816(a)', 816(a)", 818(a)', 818(a)" in the correct orientations.

Electrical contacts 830(a), 830(b) are provided in the electrical device and are at the ends of the two battery holding regions 816(a)', 818(a)'. These electrical contacts 830(a), 830(b) interface to the electrical contacts in the cooperatively structured H-shaped battery pack (not shown in FIG. 9) that is received in the H-shaped recess.

Figure 10:
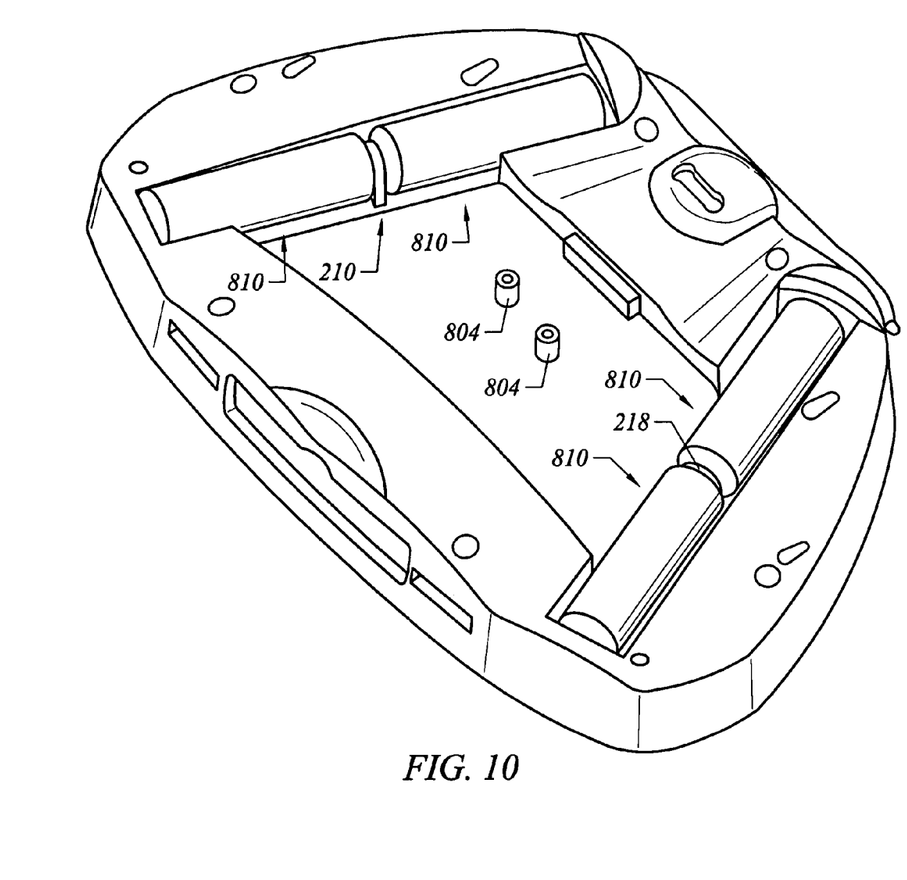
FIG. 10 shows a bottom perspective view of the electrical device shown in FIG. 8, with standard batteries in the battery holding regions.

FIG. 10 shows a number of standard batteries 810 in the battery holding regions. Adjacent, in-line batteries 810 are separated by the battery separators 210, 218. If one wants to use a rechargeable battery pack, a user may take out the batteries 810 and put in a battery pack of the type shown in FIG. 5.

The previously described embodiments included a battery separator with an aperture in a battery pack that can receive a battery separator. This allowed for a rechargeable battery pack and ordinary household batteries to be used in the same electrical apparatus, while keeping the overall apparatus thin. However, in other embodiments, it is possible to use a battery separator that is capable of vertical movement, while also using a battery pack with a solid body portion. The solid body portion of the battery pack pushes the vertically movable battery separator downward (as opposed to providing an aperture in the battery pack body for the passage of the battery separator). This is schematically illustrated in FIGS. 11(a), 11(b).

Figure 11A:
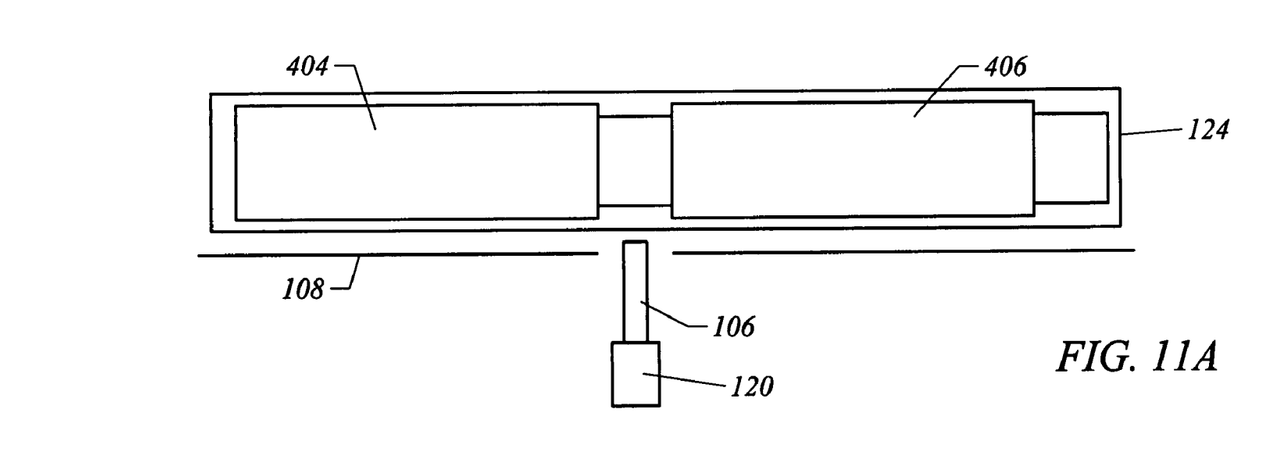
Figure 11B:
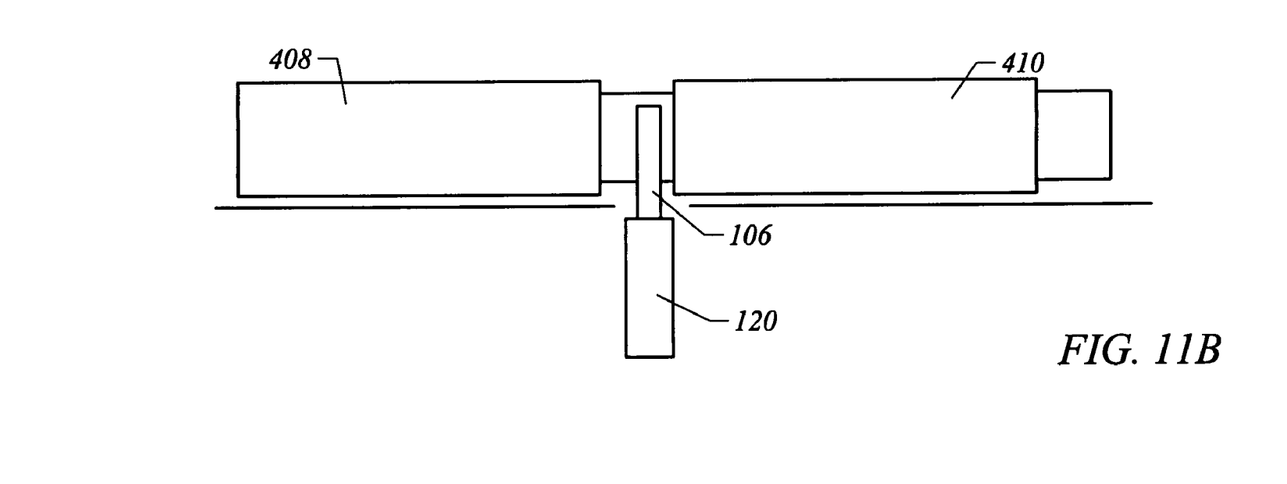

As illustrated in FIG. 11(a), a rechargeable battery pack 124 including a solid body portion above a battery separator 106 is provided. Two rechargeable batteries 404, 406, each with a protruding head and a cylindrical body, are within the battery pack body. A biasing element 120 such as a spring is under the battery separator 106 to allow the battery separator to move downward through an aperture in a housing 108 of an electrical device. This allows the rechargeable battery pack 124 to be used, even though there is no aperture for receiving the battery separator 106.

Regular non-rechargeable batteries can be used with this arrangement. As shown in FIG. 11(b), two non-rechargeable batteries 408, 410 are aligned end to end. Each non-rechargeable battery 408, 410 includes a head portion and a cylindrical body. When there is no battery pack, the biasing element 120 pushes the battery separator 106 upward so that the protruding head of the battery 408 passes through the battery separator 106, thus ensuring that the user orients the battery 408 and the battery 410 correctly. The protruding head of the battery 408 makes contact with a tail surface of the cylindrical body of the adjacent battery 408.

Figure 12:
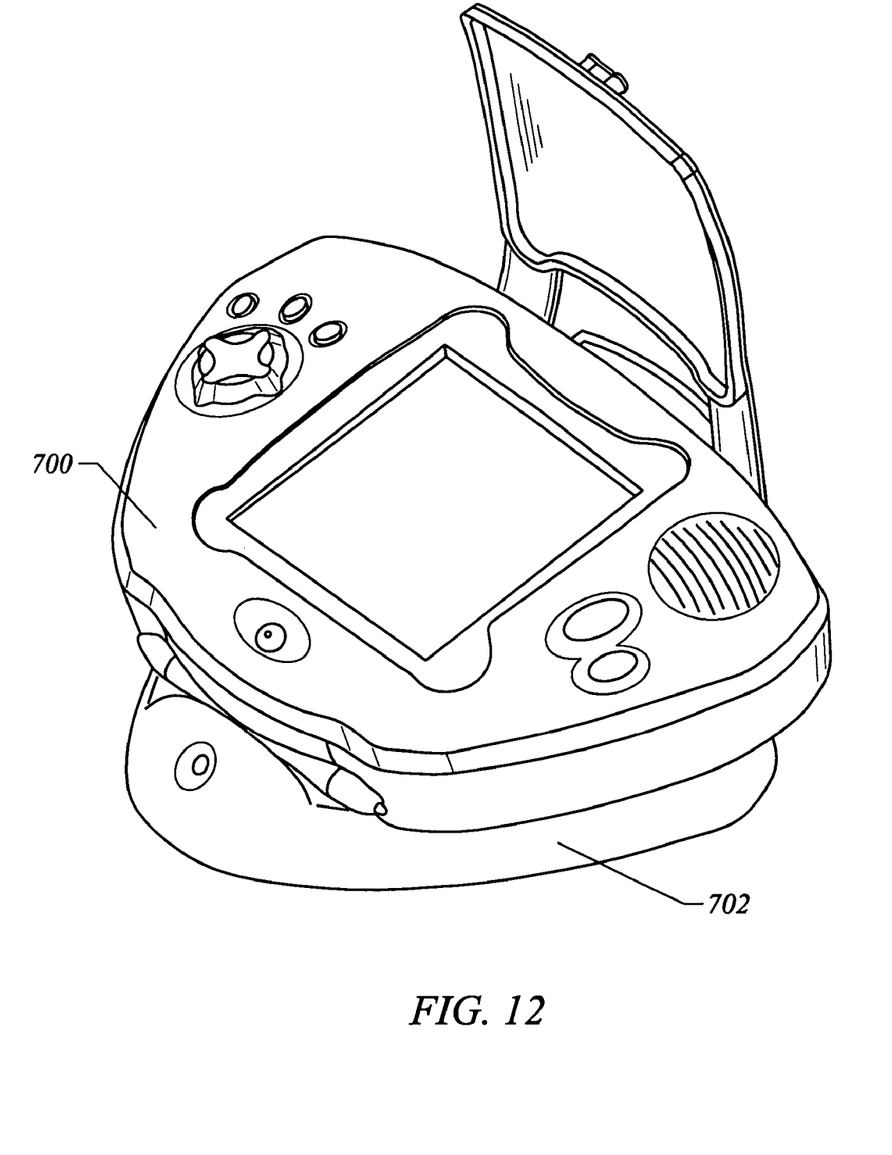
FIG. 12 is a perspective view of a hand-held gaming apparatus on top of a battery charger.

FIG. 12 shows a hand-held gaming apparatus 700 on a battery recharger 702. As shown, the hand-held gaming apparatus 700 can include any of the above described electrical devices, batteries and battery packs. The hand-held gaming apparatus 700 also includes a touch screen, stylus, a directional pad, and control buttons. Other features are described in U.S. Provisional Patent Application No. 60/446,829, filed on Feb. 10, 2003.

Embodiments of the invention have a number of advantages. First, as noted above the electrical apparatuses according embodiments of the invention can use a rechargeable battery pack or non-rechargable batteries that are in-line. The ability to substitute a rechargeable battery pack for in-line non-rechargeable batteries enables the resulting apparatus to have more power, while also being thin. Also, as noted above, the unique configuration of the electrical apparatuses' battery holding regions allow them to be used as both battery holders and ergonomic hand grips.

The present application uses relative positioning terms such as under, upper, bottom, vertical, etc. These terms are used for purposes of illustration while referring to the various inventive features of the described embodiments may or may not refer to absolute positions.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. For example, although the embodiments described above can be used with four non-rechargeable batteries and a single battery pack, it is understood that other embodiments can use two or more non-rechargeable batteries, and can use one or more battery packs.

Moreover, any one or more features of any embodiment of the invention may be combined with any one or more other features of any other embodiment of the invention, without departing from the scope of the invention. For example, the embodiments shown in FIGS. 8–10 can be combined with any of the features described with respect to any of the other Figures in the application without departing from the spirit and scope of the invention.

All patent applications, patents, and publications mentioned above are herein incorporated by reference in their entirety for all purposes. None is admitted to be prior art.

What is claimed is:

1. A battery pack comprising:
   (a) a linear portion;
   (b) a first rechargeable battery;
   (c) a second rechargeable battery; and
   (d) an aperture in the linear portion in between the first rechargeable battery and the second rechargeable battery, wherein the aperture is capable of receiving a battery separator,
   wherein the linear portion is a first linear portion aligned along a first axis, wherein the aperture is a first aperture, and wherein the battery pack includes a second linear portion aligned along a second axis, wherein the second linear portion includes a third rechargeable battery and a fourth rechargeable battery, and wherein a second aperture is in the second linear portion between the third rechargeable battery and the fourth rechargeable battery
   wherein the first and second axes diverge.

2. The battery pack of claim 1 further comprising an intermediate portion between the first and second linear portions, and including electrical contacts coupled to the first, second, third, and fourth rechargeable batteries.

3. An electrical apparatus comprising:
   the battery pack of claim 1;
   and an electrical device comprising an input device, a processor, and an audio output device, wherein the electrical device has battery holding regions wherein the battery holding regions are capable of receiving the battery pack.

4. The electrical apparatus of claim 3 wherein the electrical device is a handheld gaming device.

* * * * *